United States Patent
Fan et al.

(10) Patent No.: US 7,221,084 B2
(45) Date of Patent: May 22, 2007

(54) NARROW-BAND UVB-EMITTING PHOSPHOR

(75) Inventors: Chen-Wen Fan, Sayre, PA (US); Thomas M. Snyder, Laceyville, PA (US); Eric A. Thomason, Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 309 days.

(21) Appl. No.: 10/907,349

(22) Filed: Mar. 30, 2005

(65) Prior Publication Data

US 2006/0220519 A1    Oct. 5, 2006

(51) Int. Cl.
*H01J 61/44* (2006.01)
(52) U.S. Cl. .................. 313/486; 252/301.4 R
(58) Field of Classification Search ........ 313/467–469, 313/486; 252/301.4 R; 423/277
See application file for complete search history.

(56) References Cited

U.S. PATENT DOCUMENTS

| | | | | |
|---|---|---|---|---|
| 4,319,161 A | | 3/1982 | Looye et al. | 313/486 |
| 5,132,043 A | * | 7/1992 | Deboer | 252/301.4 R |
| 5,154,852 A | * | 10/1992 | Chau | 252/301.4 P |
| 5,776,368 A | * | 7/1998 | Chau | 252/301.4 R |
| 6,007,741 A | | 12/1999 | Hunt, Jr. et al. | 252/301.4 R |

OTHER PUBLICATIONS

U.S. Appl. No. 10/907,350, filed Mar. 30, 2005, to Fan et al.

* cited by examiner

*Primary Examiner*—Mariceli Santiago
*Assistant Examiner*—Christopher M. Raabe
(74) *Attorney, Agent, or Firm*—Robert F. Clark

(57) ABSTRACT

A narrow-band UVB emitting phosphor is described wherein the phosphor has a preferred composition represented by the general formula $(Y_{1-x-y-z}Gd_xCe_yPr_z)MgB_5O_{10}$ where x has a value in a range from 0.02 to 0.80, y has a value in a range from 0.01 to 0.97, and z has a value in a range from greater than 0 to 0.05 and $x+y+z<1$. The phosphor has a narrow emission centered at about 312 nm when excited by radiation from a low-pressure mercury discharge.

6 Claims, 2 Drawing Sheets

US 7,221,084 B2

NARROW-BAND UVB-EMITTING PHOSPHOR

TECHNICAL FIELD

This invention relates to gadolinium-activated pentaborate phosphors, which are narrow-band ultraviolet emitting phosphors typically used in low-pressure mercury vapor discharge lamps for phototherapy purpose.

BACKGROUND OF THE INVENTION

The use of ultraviolet (UV) radiation for phototherapy is well established. In fact, UV therapy is now involved in the treatment of more than 40 types of skin diseases and disorders such as psoriasis, vitiligo and eczema. Phototherapy studies of UVB wavelengths between 260 nm and 320 nm found that a narrow-band UVB emission centered at approximately 312 nm is most effective for phototherapy while at the same time limiting undesirable erythemal effects. Since the skin's erythemal (or sunburning sensitivity) is at its maximum at about 297 nm, a narrow-band emission at about 312 nm allows a patient to have longer treatment times before an erythemal response appears.

The $Gd^{3+} {}^6P_{7/2} \rightarrow {}^8S$ transitions are ideal for 312 nm narrow-band emissions. However, f-f transitions of rare earths, being parity forbidden, are very weak and the use of a sensitizer is necessary to obtain a useful emission intensity. One of the first narrow-band UVB phosphors to be developed was sensitized with bismuth, e.g., $(Gd_{0.5},La_{0.487})B_3O_6:Bi_{0.013}$. On excitation by 254 nm radiation, this borate phosphor emits the characteristic radiation with a very narrow band centered on 312 nm. However, because of the toxicity of the bismuth sensitizer, other narrow-band UVB phosphors were developed, in particular $(Gd_{0.45},Y_{0.5})MgB_5O_{10}:Ce_{0.05}$, which is described in U.S. Pat. No. 4,319,161.

Unfortunately, the peak intensity of the 312 nm emission of the Ce-sensitized phosphor is only about 60% of the peak intensity of the Bi-sensitized phosphor. Thus, it would be advantageous to provide a phosphor having a narrow-band UVB emission similar to the Ce-sensitized phosphor but with a greater emission intensity.

SUMMARY OF THE INVENTION

It is an object of this invention to obviate the disadvantages of the prior art.

It is a further object of this invention to improve the narrow-band UVB emission of a Ce-sensitized (Gd,Y)Mg borate phosphor.

In accordance with these and other objects of the invention, a narrow band UVB-emitting phosphor is provided which has a composition that may be represented by the general formula $(Y_{1-x-y-z}Gd_xCe_yPr_z)MgB_5O_{10}$ where x has a value in a range from 0.02 to 0.80, y has a value in a range from 0.01 to 0.97, and z has a value in a range from greater than 0 to 0.05 and $x+y+z<1$. The phosphor when stimulated by 254 nm radiation emits the characteristic line emission of Gd with an emission maximum at about 312 nm and as an improved emission intensity.

DETAILED DESCRIPTION OF THE INVENTION

For a better understanding of the present invention, together with other and further objects, advantages and capabilities thereof, reference is made to the following disclosure and appended claims taken in conjunction with the above-described drawing.

Figure 1:
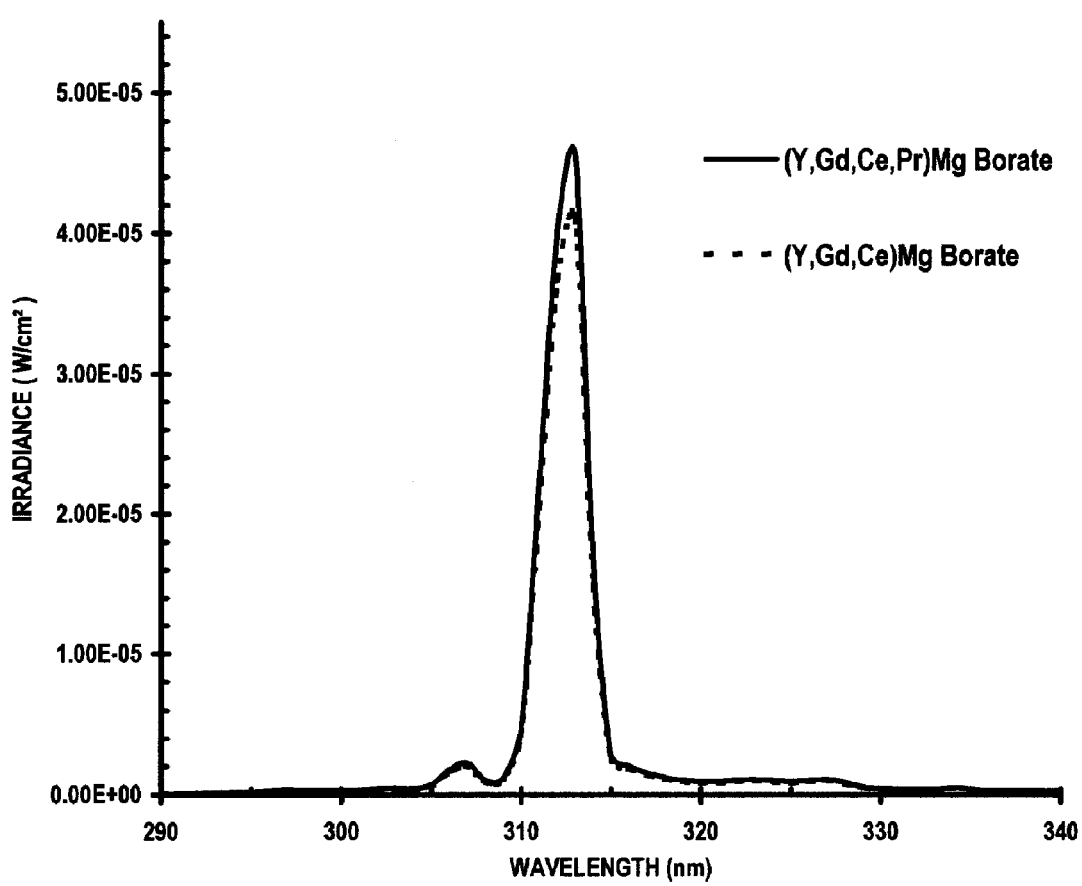
FIG. 1 shows spectral irradiance curves of the phosphors in Example 2.

It has been discovered that a small amount of praseodymium can improve the brightness of a $(Gd,Y)MgB_5O_{10}:Ce$ phosphor under 254 nm excitation. In this case, praseodymium acts as an additional sensitizer to transfer energy to the Gd ions, thereby enhancing the Gd line emission at about 312 nm (as shown in FIG. 1). In particular, the Ce and Pr ions act as sensitizers for incident radiation of 254 nm and 185 nm, respectively.

Figure 2:
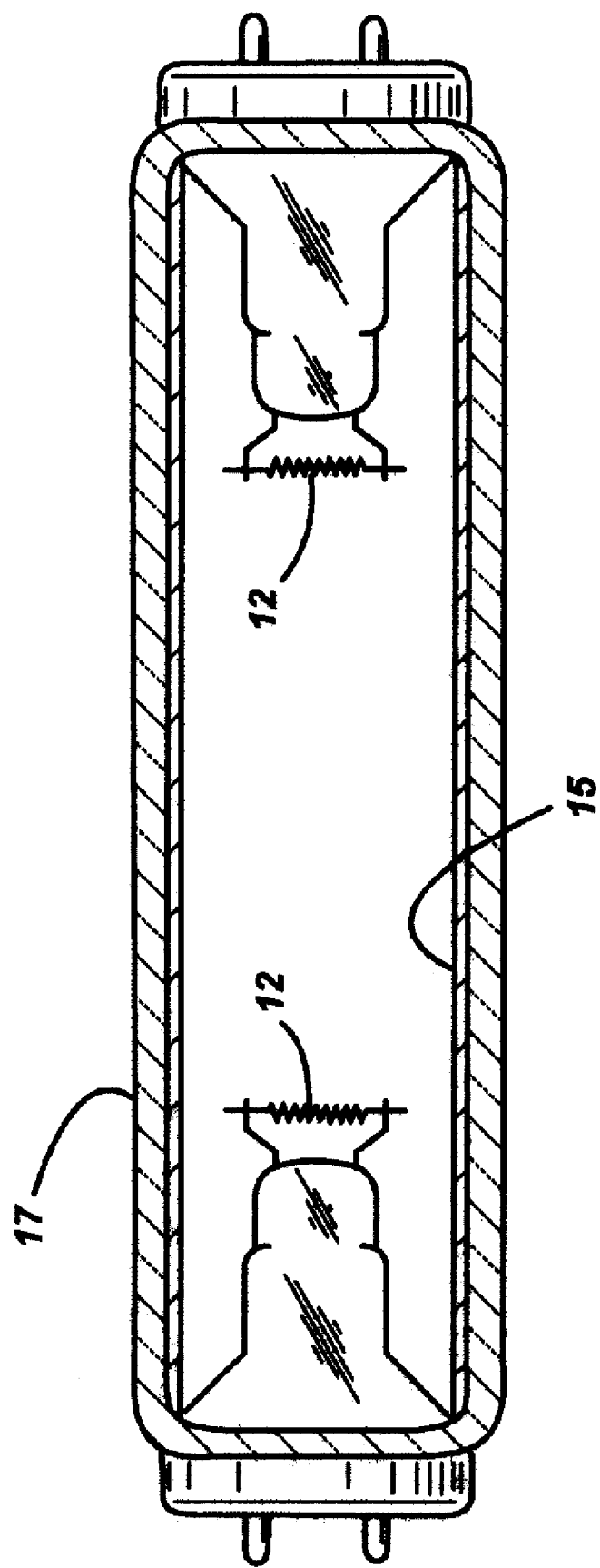
FIG. 2 is a cross-sectional illustration of a fluorescent lamp.

FIG. 2 is a cross-sectional illustration of a fluorescent lamp. The lamp has a hermetically sealed glass envelope 17. The interior of the envelope 17 is filled with an inert gas such as argon or a mixture of argon and krypton at a low pressure, for example 1-3 torr, and a small quantity of mercury, at least enough to provide a low vapor pressure (roughly 0.008 torr at 40° C.) during operation. An electrical discharge is generated between electrodes 12 to excite the mercury vapor to generate ultraviolet radiation. A phosphor coating 15 is applied to the interior surface of the envelope 17 to convert at least a portion of the ultraviolet radiation emitted by the low-pressure mercury discharge into a desired wavelength range. In this case, the phosphor coating is used to generate an emission at about 312 nm.

Generally, about 85% of the radiation from a low-pressure mercury discharge occurs at 254 nm and about 12% at 185 nm. The brightness improvement caused by doping a small amount of Pr into the borate phosphor matrix is believed to be due to the additional absorption of 185 nm radiation, making the phosphor more effective at utilizing the energy from the Hg discharge. In a preferred embodiment, the composition of the narrow band UVB-emitting phosphor of the present invention may be represented by the general formula $(Y_{1-x-y-z}Gd_xCe_yPr_z)MgB_5O_{10}$ where x has a value in a range from 0.02 to 0.80, y has a value in a range from 0.01 to 0.97, and z has a value in a range from greater than 0 to 0.05 and $x+y+z<1$. More preferably, x has a value in a range from 0.3 to 0.6, y has a value in a range from 0.02 to 0.2, and z has a value in a range from 0.002 to 0.02.

The preparation of the (Y,Gd,Ce,Pr) Mg borate phosphor utilizes a new method in which a previously prepared co-precipitate of (Y,Gd,Ce,Pr) oxide is combined with magnesia and boric acid. This is different from the prior art methods which use the individual Y, Gd, and Ce oxides as the reactants. The new method results in greater homogeneity of the fired phosphor cake and subsequently a higher brightness. In addition, the new method requires only two firing steps and results in very little or no sticking of the fired cake to the firing boats.

The present invention will be described in further detail with reference to the following examples. However, it should be understood that the present invention is by no means restricted to such specific examples.

EXAMPLE 1

A $(Gd_{0.45},Y_{0.5})MgB_5O_{10}:Ce_{0.05}$ phosphor was prepared from a mixed (Y,Gd,Ce) oxide co-precipitate. The oxide co-precipitate was formed by first dissolving 43.42 grams of $Ce(NO_3)_3 \cdot 6H_2O$ in 1500 ml of an aqueous solution containing 380 ml of concentrated nitric acid. The solution was continuously stirred and heated to 95° C. When the solution became clear, 113.47 grams of $Y_2O_3$ and 163.93 grams of $Gd_2O_3$ were added into solution slowly. The mixed solution was kept at the temperature from 85° C. to 95° C. and stirred until clear. The solution was then cooled to 60° C. and slowly poured into an oxalic acid solution containing 416 grams of oxalic acid in 1500 ml of deionized water, which was kept at a temperature from 50° C. to 60° C. and a pH from 1.0 to 2.0. A precipitate formed immediately and the milky white solution was agitated continuously at the temperature from 50° C. to 60° C. for one hour. After settling, the supernate was decanted and the oxalate co-precipitate was resuspended in cold water and agitated for 10 minutes. This procedure was repeated until the solution reached a pH of 4. After a final decantation, the oxalate co-precipitate was placed in a drying oven at 65° C. for 12 hours. The dried oxalate was then fired for 3 hours at 750° C. in air to form the mixed oxide co-precipitate with the formula of $(Gd_{0.45}, Y_{0.5}, Ce_{0.05})_2O_3$. A 131.6 gram amount of the oxide co-precipitate was thoroughly mixed with 36.88 grams of MgO and 333.88 grams of $H_3BO_3$ (an excess of 0.01 mole magnesia and 0.2 mole boric acid were used). The mixture was then fired twice in an alumina crucible, each time for 2 hours, at 1040° C. in a $N_2/H_2$ atmosphere. The fired cake was ground and sieved to −35 mesh between firings. The double-fired cake was then wet milled with 5 mm YTZ beads for 2 hours, washed, filtered, dried, and screened to −300 mesh to produce the $(Gd_{0.45}, Y_{0.5})MgB_5O_{10}:Ce_{0.05}$ phosphor.

EXAMPLE 2

A Ce and Pr co-sensitized borate phosphor was prepared with a composition of $(Gd_{0.45}, Y_{0.49}, Ce_{0.05}, Pr_{0.01})MgB_5O_{10}$. The phosphor was produced in the same manner as $(Gd_{0.45}, Y_{0.5})MgB_5O_{10}:Ce_{0.05}$ phosphor in Example 1, except that 111.2 grams of $Y_2O_3$, 163.93 grams of $Gd_2O_3$, 43.42 grams of $Ce(NO_3)_3 \cdot 6H_2O$, and 3.38 grams of $Pr_4O_7$ were dissolved by dilute nitric acid and an excess of oxalic acid was added thereto to obtain co-precipitate oxalates of Y, Gd, Ce and Pr. The co-precipitate was filtered, dried and calcined to form the oxide co-precipitate with the formula of $(Gd_{0.45}, Y_{0.49}, Ce_{0.05}, Pr_{0.01})_2O_3$. A 131.6 gram amount of the mixed oxide co-precipitate was thoroughly mixed with 36.88 grams of magnesia and 333.88 grams of boric acid and mixture was fired and prepared as in Example 1.

Tables 1 and 2 compare the UVB irradiance output (microwatts per square centimeter) from low-pressure mercury discharge lamps (F72T12) containing Ce and Pr co-sensitized borate phosphor of Example 2 and the Ce-sensitized phosphor of Example 1. The UVB irradiance of each lamp was measured through a filter on a 12-inch section from a 12-inch distance. The reported irradiance is calculated from the integrated area under the emission curve from 307 nm to 317 nm. The 100-watt fluorescent lamps were operated at 430 mA (Table 1) and 800 mA (Table 2) for up to 100 hours. As can be seen, the lamp data show that the UVB irradiance output increases significantly by substituting Pr into (Y,Gd,Ce)Mg borate matrix. The results also indicate that the Ce and Pr co-sensitized phosphor made according to this invention has a better maintenance in lamps, especially operated when at 430 mA. (The maintenance is defined as the 100-hour irradiance output divided by 0 hour irradiance output and multiplied by 100%, (100 hour/0 hour)×100%.) Moreover, as shown by the spectra provided in FIG. 1, the peak position does not shift when the Pr sensitizer is doped into the borate phosphor. The enhanced narrow-band emission remains centered at about 312 nm.

TABLE 1

Lamps Operated at 430 mA.

| Phosphor | Irradiance at 0 hours | Irradiance at 100 hours | Maintenance (%) |
|---|---|---|---|
| Example 1 $(Gd_{0.45}, Y_{0.5})MgB_5O_{10}:Ce_{0.05}$ | 123.1 | 102.8 | 83.5 |
| Example 2 $(Gd_{0.45}, Y_{0.49}, Ce_{0.05}, Pr_{0.01})MgB_5O_{10}$ | 132.6 | 116.7 | 88.0 |

TABLE 2

Lamps Operated at 800 mA

| Phosphor | Irradiance at 0 hours | Irradiance at 100 hours | Maintenance (%) |
|---|---|---|---|
| Example 1 $(Gd_{0.45}, Y_{0.5})MgB_5O_{10}:Ce_{0.05}$ | 156.3 | 134.8 | 86.2 |
| Example 2 $(Gd_{0.45}, Y_{0.49}, Ce_{0.05}, Pr_{0.01})MgB_5O_{10}$ | 172.4 | 148.5 | 86.1 |

While there has been shown and described what are at the present considered the preferred embodiments of the invention, it will be obvious to those skilled in the art that various changes and modifications may be made therein without departing from the scope of the invention as defined by the appended claims.

What is claimed is:

1. A narrow-band UVB emitting phosphor having a composition represented by the general formula $(Y_{1-x-y-z}Gd_xCe_yPr_z)MgB_5O_{10}$ where x has a value in a range from 0.02 to 0.80, y has a value in a range from 0.01 to 0.97, and z has a value in a range from greater than 0 to 0.05 and x+y+z<1.

2. The phosphor of claim 1 wherein x has a value in a range from 0.3 to 0.6, y has a value in a range from 0.02 to 0.2, and z has a value in a range from 0.002 to 0.02.

3. The phosphor of claim 1 wherein the phosphor has an emission at about 312 nm when stimulated by radiation from a low-pressure mercury discharge.

4. A fluorescent lamp comprising a glass envelope having a phosphor coating on an interior surface, the phosphor coating comprising a narrow-band UVB emitting phosphor having a composition represented by the general formula $(Y_{1-x-y-z}Gd_xCe_yPr_z)MgB_5O_{10}$ where x has a value in a range from 0.02 to 0.80, y has a value in a range from 0.01 to 0.97, and z has a value in a range from greater than 0 to 0.05 and x+y+z<1.

5. The fluorescent lamp of claim 4 wherein x has a value in a range from 0.3 to 0.6, y has a value in a range from 0.02 to 0.2, and z has a value in a range from 0.002 to 0.02.

6. The fluorescent lamp of claim 4 wherein the phosphor has an emission at about 312 nm when stimulated by radiation from a low-pressure mercury discharge.

* * * * *